United States Patent
Beichl

(10) Patent No.: US 6,799,765 B2
(45) Date of Patent: Oct. 5, 2004

(54) BRUSH FOR A BRUSH SEAL

(75) Inventor: Stefan Beichl, Herrsching (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/795,574

(22) Filed: Feb. 28, 2001

(65) Prior Publication Data

US 2001/0022431 A1 Sep. 20, 2001

(30) Foreign Application Priority Data

Feb. 28, 2000 (DE) .......................... 100 09 432

(51) Int. Cl.$^7$ .......................... F16J 15/44; B29D 31/02
(52) U.S. Cl. ...................................... 277/355; 264/243
(58) Field of Search ........................... 277/355; 264/243

(56) References Cited

U.S. PATENT DOCUMENTS

| 4,399,337 A | * | 8/1983 | Annis ........................ 200/16 B |
| 4,795,677 A | | 1/1989 | Gray |
| 4,809,990 A | * | 3/1989 | Merz ........................... 277/355 |
| 4,863,773 A | | 9/1989 | Rousseau et al. |
| 5,051,300 A | | 9/1991 | Rousseau |
| 5,183,197 A | | 2/1993 | Howe |
| 5,430,080 A | * | 7/1995 | Iwata et al. .................. 524/100 |
| 5,499,826 A | * | 3/1996 | Pippert et al. ............... 277/437 |
| 5,562,966 A | * | 10/1996 | Clarke et al. ................ 428/113 |
| 5,730,922 A | * | 3/1998 | Babb et al. .................. 264/258 |
| 6,062,463 A | * | 5/2000 | Hoffmueller et al. ........ 228/212 |
| 6,062,815 A | * | 5/2000 | Holt et al. ................... 415/231 |
| 6,221,475 B1 | * | 4/2001 | Domergue et al. ......... 428/292.1 |

FOREIGN PATENT DOCUMENTS

| DE | 196 41 374 | | 12/1997 |
| EP | 0 121 797 | | 10/1984 |
| EP | 0 427 629 | | 5/1991 |
| EP | 0 765 619 A1 | * | 2/1997 |
| EP | 0 765 619 | | 4/1997 |
| EP | 0 598 631 | | 5/1999 |

* cited by examiner

*Primary Examiner*—Anthony Knight
*Assistant Examiner*—Doug Hutton
(74) *Attorney, Agent, or Firm*—Kenyon & Kenyon

(57) ABSTRACT

Brush for a brush seal, having a plurality of ceramic fibers, which are held with a part of their length in an integrally continuous material in a matrix forming a solid. The matrix is made at least extensively of carbon, which is made by pyrolysis of a synthetic resin (precursor resin).

8 Claims, 1 Drawing Sheet

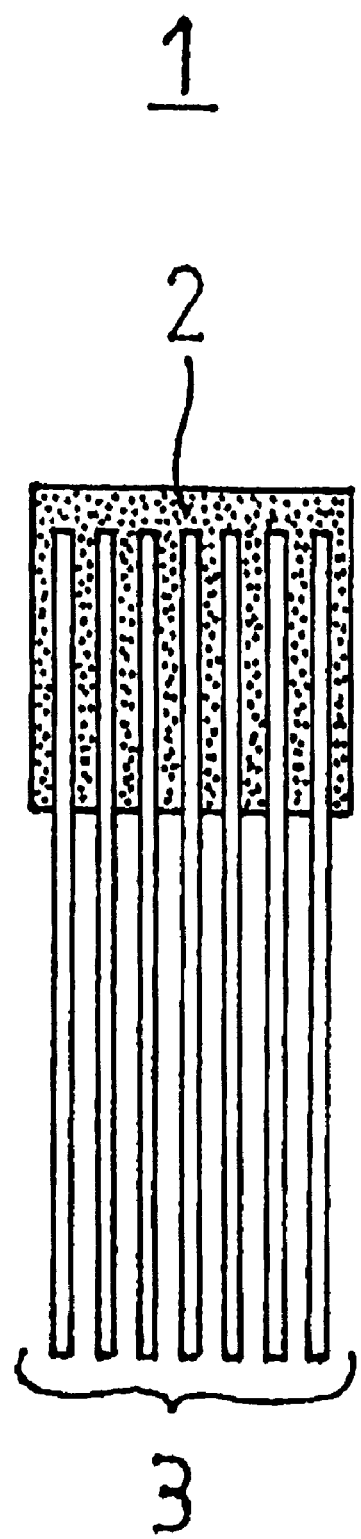

BRUSH FOR A BRUSH SEAL

FIELD OF THE INVENTION

The present invention relates to a brush for a brush seal having a plurality of definably arranged ceramic fibers.

BACKGROUND INFORMATION

Brush seals are counted among non-hermetic types of construction, because as a rule, they operate under a certain leakage, in cases where different pressures prevail on each side of the seal. Because of the elastic yieldingness of the bristles, they are particularly non-sensitive to positional deviations of the component parts from one another, e.g. as to eccentricity, and operate with little wear and low friction. An important field of application of brush seals is in rotor-stator sealing locations in turbo machines. It is logical that the properties of a brush seal depend to a great extent on the properties of the bristles, and here, aside from the bristle geometry, attention must be paid primarily to the brush material. Criteria such as durable elasticity, wear resistance, temperature and media resistance, fracture resistance, etc, play a role. The use of bristles made of plastic, metal or ceramics is known, and possibly also of combinations of these. In using ceramic bristles, one hopes especially to attain high media and temperature stability, high wear resistance and the utmost durable elasticity. However, in view of their stiffness and brittleness, problems also arise. Ceramic bristles/fibers tend to be less elastically and not at all plastically deformable. They must also not be bent around tight radii, i.e. snapped over, since there is a danger of fracture. A further problem is the restraint, or rather fixing of the bristles/fibers in the position and distribution required for forming the brush. The customary joining methods for metals, like welding and soldering, are not applicable or applicable only with great limitations when it comes to purely ceramic fibers. It is possible to metallize the surface of ceramic fibers, so that a better wettability to fusible metals such as solder is attained. Metallizing fibers is costly, however, and besides that, the fiber's properties are changed.

A method together with a device for producing brush seals is known from German Patent No. 196 41 374 C1, in which bristles cut to length are set in a definable position and distribution into one or between two brush end pieces and integrally connected as one material with one another and the brush end pieces. Ceramic bristles can also be processed in this manner, wherein the integral connection can be achieved, for instance, by using a suitable adhesive. Adhesives, such as those based on synthetic resin, often exhibit unsatisfactory media and temperature stability, and some of them tend to exhibit creep or shrinking. Ceramic, cementlike adhesives often exhibit insufficient adhesion, and tend to split off or form tears all the way to disintegration.

Among ceramic fibers, silicon carbide fibers (SiC fibers) are of special interest from the point of view of their properties. Trials have been made to combine SiC fibers with glass solders. But the fiber properties deteriorated so much by brittleness that this method of combination was not further pursued.

Brush seals are also known in which the bristles/fibers are held by friction locking, i.e. by friction under the effect of clamping or elastic forces. With hard, low-resilient and low friction ceramic fibers, strong forces and exact production techniques would be required for this, and the danger of snapping or breaking would again exist. Loosening of a few fibers could have the disintegration/destruction of the whole brush as a consequence.

In another technical field, namely the production of high-tensile fiber combination component parts, in the case of high temperature applications, so-called CMC's (Carbon Matrix Composites) are known. As a rule, these are high-tensile carbon fiber structures (rovings, webs, knit fabrics, etc.) in a carbon matrix, i.e. they are carbon/carbon combinations (C/C, carbon/carbon). The carbon matrix can be produced, at least in part, by pyrolysis of a precursor resin, i.e. of a suitable, carbon-containing synthetic resin (carbon precursor).

On this matter, see European Patent No. EP 0 598 631 B1. In this document one can see that crystalline, powder-form SiC should be integrated into the structure, distributed space-wise, to be sure, as oxidation protection for the carbon structure.

SUMMARY OF THE INVENTION

Starting from the described related art, an object of the present invention is to provide a brush for a brush seal which stands out as an especially durable, inherently stable, media and temperature resistant and fiber-protective matrix for the ceramic bristles/fibers.

It has been shown that a carbon matrix produced by pyrolysis from a precursor resin, at great stability and durability makes possible the protective embedding of ceramic fibers, susceptible to snapping and denting, in view of high mechanical loading and durability of the brush, and therefore the brush seal as a whole.

BRIEF DESCRIPTION OF THE DRAWING

The FIGURE shows in simplified illustration, not to scale, a cross-section through a brush with several rows of bristles.

DETAILED DESCRIPTION

Referring to the FIGURE, brush 1 includes a plurality of ceramic fibers 3, which are fixed in defined orientation and distribution in a matrix 2, which forms a solid. Usually, the longer portion of the fibers 3 projects freely from the matrix. Since brush seals mostly act together with rotationally symmetrical or flat component part surfaces, ring-shaped or bar-shaped types of construction predominate. Thus, the consolidated matrix 2 will generally form an annular shape, an annular shape segment or a straight rod of finite length. The fibers (bristles) 3 shown here in separate parallel rows, can also be arranged largely without lateral clearance, i.e. contiguous, with a view to mutual support and increased sealing effectiveness. The fibers in the various rows can have different thicknesses and different material properties. In general, an attempt is made at a fiber distribution which is as even as possible, with the orientation possibly being different from row to row. All this is familiar to one skilled in the art, and will not be discussed here in greater detail.

The consolidated matrix 2 having the integrally continuous material-fixed fibers 3 is usually integrated into a sealing housing (not illustrated), which is put together, for example, from a plurality of metal parts. Then again, it is also possible to combine a plurality of matrix/fiber units in one housing, for example, in order to increase the number of rows of bristles.

According to the present invention, the matrix 2 is made for the most part, or completely of carbon which was produced pyrolytically from a suitable synthetic resin. Such a precursor resin can, for instance, have a phenol/formaldehyde base. When soaking the fibers in the resin, care must be taken that only the desired fastening region is wetted and connected. After the soaking, the resin is cured, for example, at a temperature of 200° C. under a protective gas. The subsequent pyrolysis takes place, for example, at 850° C., also in a protective gas atmosphere of inert gases like nitrogen or argon. This produces a matrix structure made up essentially of carbon, in which the ceramic fibers are firmly but protectively anchored. The preferred material for the fibers/bristles is silicon carbide (SiC), which is cut off from "continuous filaments" of specified thickness. Within the framework of the present invention, it is entirely possible to embed additional materials, e.g. in particle form, into the carbon matrix, or to give it a surface coating.

What is claimed is:

1. A brush for a brush seal, comprising:
    a matrix consisting substantially entirely of carbon; and
    a plurality of definably arranged ceramic fibers,
    wherein a part of a length of a first end of the fibers is embedded in an integrally continuous material in the matrix forming a solid, a second end of the fibers projecting freely from the matrix, and
    wherein the matrix includes a synthetic resin in the form of a pyrolitical precursor resin.

2. The brush according to claim 1, wherein the fibers are composed of silicon carbide.

3. The brush according to claim 1, wherein the brush is for a brush seal in a turbo machine.

4. The brush according to claim 1, wherein the brush is for a brush seal in a gas turbine.

5. A method for producing a brush for a brush seal, comprising the steps of:
    producing a matrix by pyrolysis of a synthetic resin in the form of a precursor resin;
    providing a plurality of definably arranged ceramic fibers;
    embedding a part of a length of a first end of the fibers in an integrally continuous material in the matrix, a second end of the fibers projecting freely from the matrix; and
    forming the matrix into a solid, an end material of the matrix consisting substantially entirely of carbon.

6. The method according to claim 5, wherein the providing step includes providing fibers that are composed of silicon carbide.

7. The method according to claim 5, further comprising the step of providing the brush seal in a turbo machine.

8. The method according to claim 5, further comprising the step of providing the brush seal in a gas turbine.

* * * * *